(No Model.)
R. H. ELLIOTT.
COMBINED AUGER AND REAMER FOR MINING PURPOSES.
No. 564,509. Patented July 21, 1896.
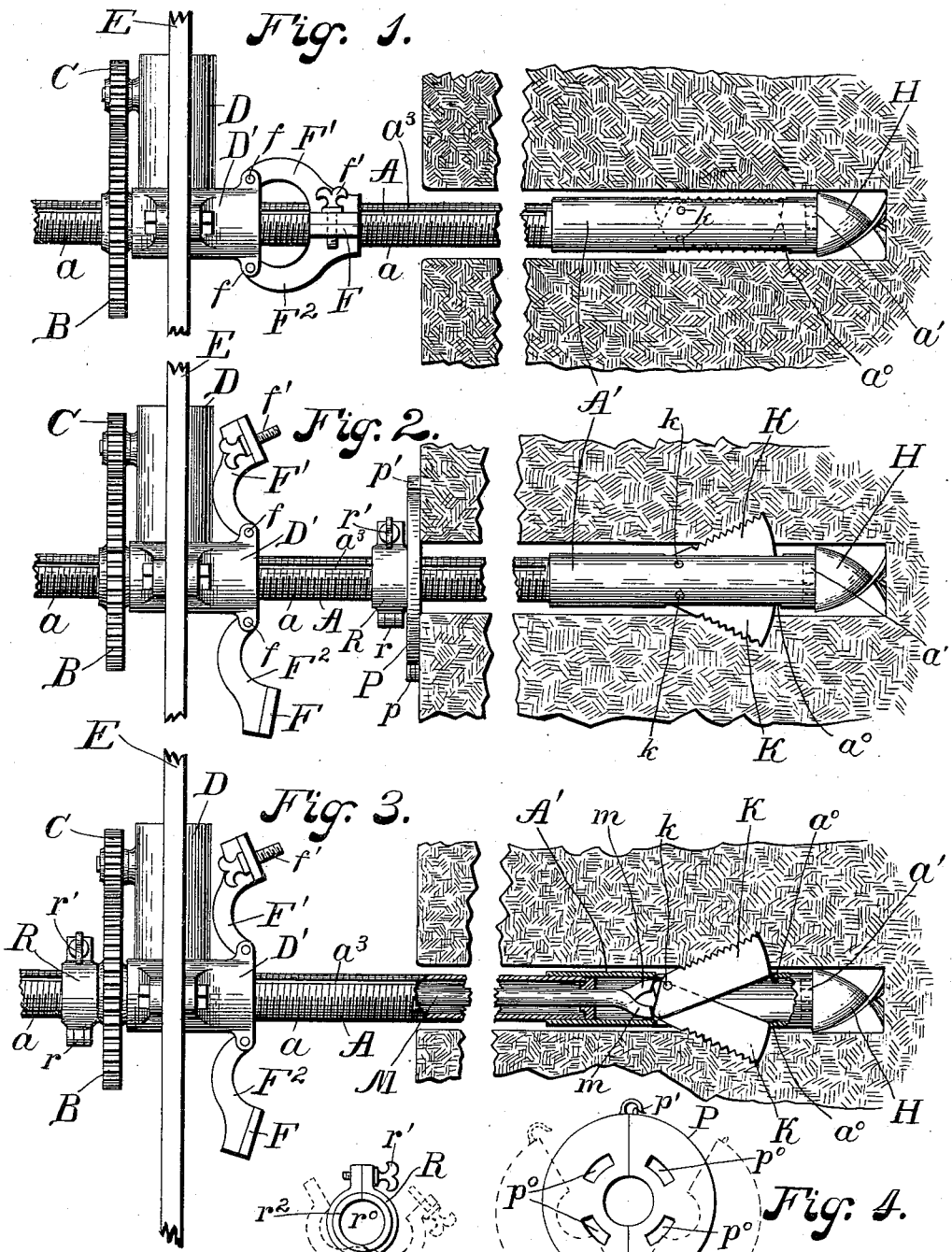

UNITED STATES PATENT OFFICE.

ROBERT H. ELLIOTT, OF BIRMINGHAM, ALABAMA, ASSIGNOR TO THE ALABAMA BLASTING AND MINING COMPANY, OF SAME PLACE.

COMBINED AUGER AND REAMER FOR MINING PURPOSES.

SPECIFICATION forming part of Letters Patent No. 564,509, dated July 21, 1896.

Application filed June 15, 1895. Serial No. 552,950. (No model.)

*To all whom it may concern:*

Be it known that I, ROBERT H. ELLIOTT, a citizen of the United States, residing at Birmingham, in the county of Jefferson and State of Alabama, have invented certain new and useful Improvements in a Combined Auger and Reamer for Mining Purposes; and I do hereby declare the following to be a full, clear, and exact description of the invention, such as will enable others skilled in the art to which it appertains to make and use the same.

My invention relates to improvements in machines for use in mining coal and other like minerals; and it consists in providing a combined reamer and auger which may be used either as a reamer or as an auger, as may be preferred, and in providing means for blowing or washing the chips or cuttings from the bore-hole by means of an air-blast, or a jet of water, or other fluid.

The said invention will be understood by reference to the accompanying drawings, in which the same parts are indicated by the same letters throughout the several views.

Figure 1 represents a section through the bore-hole, showing the machine in use as an auger. Fig. 2 represents a section through the bore-hole, showing the machine in use as a reamer. Fig. 3 is a similar view to that shown in Fig. 2, except that the device for arresting the feed of the drill-spindle is differently placed, and, moreover, the hollow drill-spindle is shown in section. Fig. 4 represents a side elevation of the bearing-plate that is used over the mouth of the bore-hole, as shown in Fig. 2; and Fig. 5 represents a detachable collar that is clamped on the drill-spindle to prevent the same from feeding forward, as will be hereinafter described.

A represents the drill-spindle which is screw-threaded, as at $a$, and is rotated by means of the gear-wheel B, meshing in the pinion C, which pinion is driven by the air or other engine D, connected to the jack-post E by the frame D'. An air-engine is preferred, so that the exhaust-air therefrom may be used to blow out the chips, as has been described in the patent granted December 11, 1894, No. 530,512, to Robert H. Elliott and John B. Carrington.

The threads on the drill-spindle engage in a feed-nut F, which is made of two parts mounted on the ends of the arms F' and F², pivoted at $f$ to the frame D', and clamped together by means of the clamp-screws $f'$. When these two arms are clamped together, as shown in Fig. 1, the drill-spindle will feed forward or backward, according to the direction of the revolution of the gear-wheel B, but when the two arms are opened out, as shown in Figs. 2 and 3, the tendency to feed forward or backward will be done away with, except that which is due to the action of the cutting apparatus on the drill-head A. This drill-head A' is rigidly attached to the drill-spindle A in any convenient way, and like the drill-spindle is hollow, but is provided with end openings $a'$, as shown in Fig. 3, to permit the flow of air through these end openings around the cutting portions of the auger H, and out past the reamer-blades K, and thence backward through the bore-hole, carrying therewith the chips or cuttings.

The auger H is made fast to the end of the drill-head A' in any convenient way, and the blades K of the reamer are pivoted, as at $k$, in the drill-head, and are forced outward or drawn inward through the slats $a^0$ in any convenient way, as by means of the rod M, having the bifurcated ends $m$, adapted to bear on the heel of the reamer-blades. Only one of these reamer-blades may be used if desired, and any suitable means for moving the reamer-blade out or in may be adopted.

When the machine is to be used as an auger, the feed-nut is clamped in place, as shown in Fig. 1, and the drill-spindle is revolved and the air blown in in the usual way.

Now when it is desired to use the machine as a reamer the feed-nut is released, as shown in Fig. 2, and the reamer-blades are forced outward in the usual way.

Unless some provision were made to check the feed of the drill-spindle due to the biting of the auger in the coal and the wedging effect of the reamer-blades as they are forced outward, the drill-spindle would continue to feed forward slowly, notwithstanding that the feed-nut was no longer in operation. To prevent this forward feed of the drill-spindle, I provide a clamp-collar R, whose interior $r'$ is provided with a pad $r^2$ of rubber or like material, while the said collar is made in two parts pivoted together, as at $r$, and clamped to each other by the clamp-screw $r'$, as shown in Fig. 5. This ring or collar clamps firmly on the drill-spindle, over the threads thereof, and is caused to bear either against a bearing-plate P, as shown in Fig. 2, or the rear face of the hub of the gear-wheel B, as shown in Fig. 3.

In Fig. 2 the bearing-plate P is made in two parts hinged together, as at $p$, and clamped together by means of the clamp-screws $p'$, while the center of the said plate P is perforated, as at $p^0$, to allow the free passage of air from the bore-hole therethrough. The details of this plate are shown most clearly in Fig. 4.

Referring again to Fig. 2, the collar R is clamped on the drill-spindle close to the said plate P, and the forward feed of the drill-spindle is soon checked by the collar R bringing up against the said plate P, and revolving in contact with the face of said plate as the drill-spindle is revolved. Any suitable antifriction device between the said plate and the said collar may be used if desired.

In the device shown in Fig. 3 the collar R is clamped on the drill-spindle just behind the hub of the gear-wheel B, and any tendency of the drill-spindle to feed forward, due to the effect of the auger or of the reamer-blade, is checked by the supports of the machine. Any suitable antifriction device may be employed between the hub of the said gear-wheel B and the said collar R if desired, but this will ordinarily not be necessary.

In practice the auger is bored down to the desired vein, the cuttings being meantime blown out by the air-blast, and then the holding-collar R is put on, and the reamer-blades forced outward to allow the rotating spindle to cut a chamber around the bore-hole, into which the blasting-charge is placed in the ordinary way. The chips from the reamer are also blown out by the air passing through the hollow spindle, leaving the large chamber clear for the bursting-charge after the drill-spindle has been withdrawn.

The drill-spindle is longitudinally slotted, as at $a^3$, which slot serves to hold the feather of the gear-wheel B, which drives the drill-spindle.

Thus it will be seen that I provide a machine which can be used either as an auger or as a reamer without being withdrawn from the bore-hole, and in which the air-pressure removes the chips or cuttings, leaving the bore-hole clear for the insertion of the explosive charge and of the tamping.

It will be obvious that various modifications of the herein-described apparatus might be made which could be used without departing from the spirit of my invention.

Having thus described my invention, what I claim, and desire to secure by Letters Patent of the United States, is—

1. In a mining-machine, the combination with a hollow drill-spindle with outlets near the drill-head for the passage of fluid from said drill-spindle therethrough, of a boring-tool secured to the front end of said drill-spindle, an extensible blade mounted in said drill-spindle with means for forcing said blade outward when desired, and a clamp-collar clamped on said drill-spindle and adapted to check the forward motion thereof, with a rigid surface bearing against said clamp-collar, substantially as described.

2. In a mining-machine, the combination with a hollow drill-spindle with outlets near the drill-head for the passage of fluid from said drill-spindle therethrough, of a boring-tool secured to the front end of said drill-spindle, an extensible cutting-blade mounted in said drill-spindle, with means for forcing the said blade outward when desired, a hinged collar provided with a holding inner face and adapted to be clamped on the drill-spindle, and means for checking the longitudinal movement of said collar due to the forward feed of the drill-spindle, substantially as described.

3. In a mining-machine, the combination with a hollow drill-spindle with outlets near the drill-head for the passage of fluid from said drill-spindle therethrough, of a boring-tool secured to the front end of said drill-spindle, an extensible cutting-blade, or extensible cutting-blades, mounted in said drill-spindle, with means for forcing the said blade or blades outward when desired, a detachable feed-nut adapted to give the desired feed to the boring-tool, a hinged collar provided with a holding inner face, and adapted to be clamped on the drill-spindle when desired, and means for checking the longitudinal movement of said collar, due to the forward feed of the drill-spindle, substantially as described.

In testimony whereof I affix my signature in presence of two witnesses.

ROBERT H. ELLIOTT.

Witnesses:
W. G. ROBINSON,
J. B. ROBINSON.